(No Model.)

L. & J. D. WALLACE.
ICE CREAM FREEZER.

No. 523,781. Patented July 31, 1894.

Witnesses,

Lloyd Wallace
J. D. Wallace.
Inventors:
By John S. Duppé
Atty.

UNITED STATES PATENT OFFICE.

LLOYD WALLACE AND JEFF DAVIS WALLACE, OF PEORIA, TEXAS.

ICE-CREAM FREEZER.

SPECIFICATION forming part of Letters Patent No. 523,781, dated July 31, 1894.

Application filed October 12, 1893. Serial No. 488,010. (No model.)

*To all whom it may concern:*

Be it known that we, LLOYD WALLACE and JEFF DAVIS WALLACE, citizens of the United States, residing at Peoria, in the county of Hill and State of Texas, have invented certain new and useful Improvements in Ice-Cream Freezers; and we do hereby declare the following to be a full, clear, and exact description of the invention, such as will enable others skilled in the art to which it appertains to make and use the same.

Our invention is an "ice cream freezer;" and consists in the novel construction and arrangement of its parts.

The object of our invention is to freeze a number of cans of ice cream at the same time. The cans may be made to freeze the ice cream in blocks or in a body.

Figure 1:
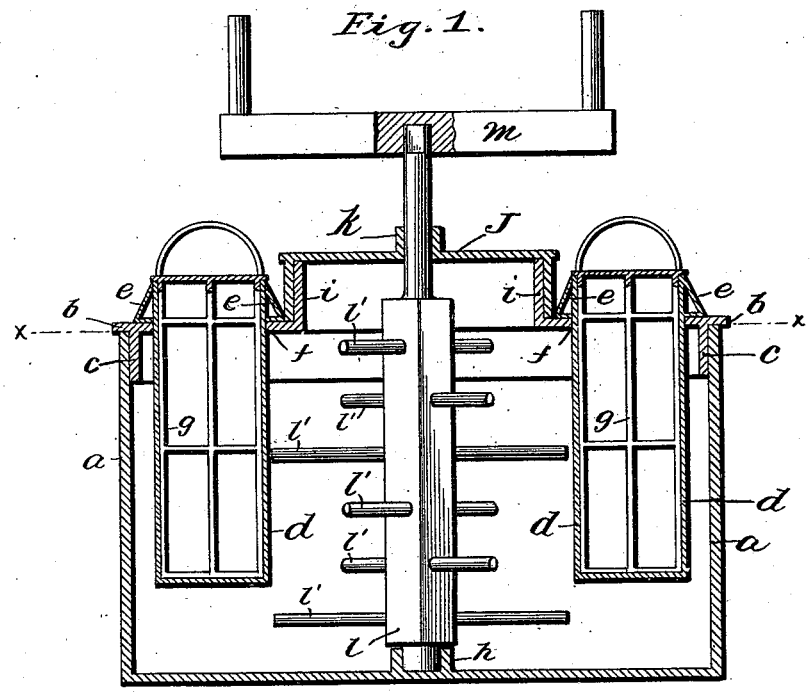
Figure 2:
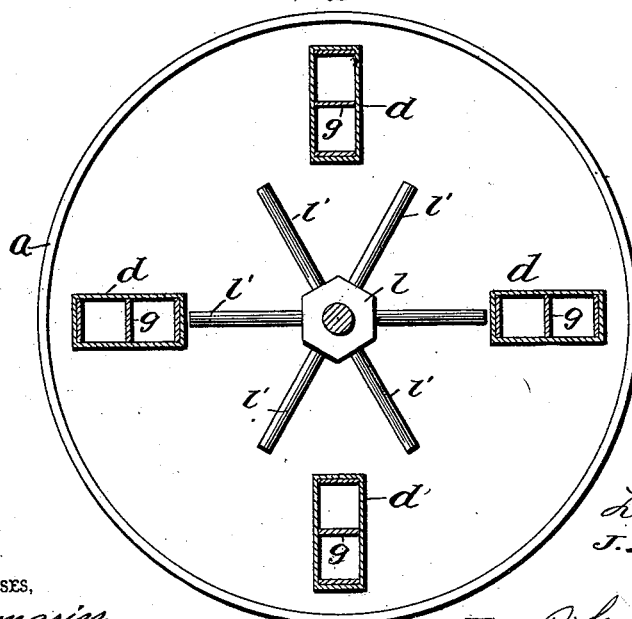

In the accompanying drawings: Figure 1 is a vertical sectional view of our invention. Fig. 2 is a horizontal sectional view, the top part being removed at the line $x, x$.

Our invention is described as follows:

$a$, represents the can.

$b$, represents the cover.

$c$, represents the flange of the cover.

$d$, represents the cream cans provided with bosses $e$, to prevent the cans from slipping through the openings $f$, in the lid $b$. Said cans are provided with an inside frame $g$, to the end that the cream may be frozen in blocks. On the bottom and center of the can is a journal bearing $h$.

The cover $b$, is provided with a vertical flange $i$, over which fits a lid J, provided with a journal bearing $k$. In the can $a$, there is journaled vertically in bearings $h$, and $k$, a shaft $l$, provided with arms $l'$, which reach nearly to the cream cans $d$. On the top of said shaft $l$, is provided a handle $m$.

The material to be frozen is first put into the cream cans $d$, the ice is then put into the can $a$, so as to surround the cream cans, the shaft $l$, and the arms $l'$; the shaft is then rotated causing the cream to freeze quickly.

Having described our invention, what we claim as new, and desire to secure by Letters Patent, is—

1. The combination of the can $a$, provided with central bearing $h$; cover $b$, provided with the inner flange $c$, can openings $f$, central opening and vertical flange $i$; lid J, fitting over vertical flange $i$, and provided with journal bearing $k$; cream cans $d$, adapted to fit in openings $f$, and provided with bosses $e$; shaft $l$, provided with horizontal arms $l'$, journaled in bearings $h$, and $k$; said cream cans adapted to hold suitable cream frames, substantially as shown and described and for the purposes set forth.

2. The combination of the can provided with a central journal bearing; a cover provided with can openings, a central opening, and central vertical flange; a lid fitting over the central vertical flange of said cover; shaft $l$, provided with horizontal arms, journaled in said openings and adapted to rotate for the purpose of facilitating the freezing of the cream, substantially as shown and described and for the purposes set forth.

In testimony whereof we affix our signatures in presence of two witnesses.

LLOYD WALLACE.
JEFF DAVIS WALLACE.

Witnesses:
E. L. JACKSON,
S. C. DYER.